United States Patent
Lee et al.

(10) Patent No.: US 11,758,288 B2
(45) Date of Patent: Sep. 12, 2023

(54) DEVICE FOR IMPROVING IMAGE RESOLUTION IN CAMERA SYSTEM HAVING LENS THAT PERMITS DISTORTION AND OPERATION METHOD THEREOF

(71) Applicant: SAMSUNG ELECTRONICS CO., LTD., Suwon-si (KR)

(72) Inventors: Jeongguk Lee, Seoul (KR); Yunseok Choi, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/350,003

(22) Filed: Jun. 17, 2021

(65) Prior Publication Data

US 2022/0122219 A1   Apr. 21, 2022

(30) Foreign Application Priority Data

Oct. 21, 2020 (KR) .......................... 10-2020-0136546

(51) Int. Cl.
*H04N 23/84* (2023.01)
*G06T 5/00* (2006.01)
*H04N 23/80* (2023.01)
*H04N 25/13* (2023.01)
*H04N 25/778* (2023.01)

(52) U.S. Cl.
CPC ............ *H04N 23/84* (2023.01); *G06T 5/006* (2013.01); *H04N 23/815* (2023.01); *H04N 25/134* (2023.01); *H04N 25/778* (2023.01)

(58) Field of Classification Search
CPC ........... H04N 5/23229; H04N 5/23235; H04N 5/3572; H04N 9/0451–04561; H04N 23/80–959; H04N 9/64; H04N 9/69; H04N 25/11–6153; G06T 3/40–4015; G06T 5/006
See application file for complete search history.

(56) References Cited

U.S. PATENT DOCUMENTS

| | | | |
|---|---|---|---|
| 8,330,876 B2 | 12/2012 | Morikuni | |
| 9,179,113 B2 | 11/2015 | Tachi | |
| 9,210,391 B1 | 12/2015 | Mills | |
| 9,219,870 B1 | 12/2015 | Mills et al. | |

(Continued)

FOREIGN PATENT DOCUMENTS

| | | |
|---|---|---|
| CN | 106353747 | 1/2017 |
| CN | 108886571 | 11/2018 |

(Continued)

OTHER PUBLICATIONS

Yoonjong Yoo, "Low-Light Image Enhancement Using Adaptive Digital Pixel Binning", 2015, Sensors 2015 (Year: 2015).*

*Primary Examiner* — Paul M Berardesca
(74) *Attorney, Agent, or Firm* — F. Chau & Associates, LLC

(57) ABSTRACT

An electronic device, method thereof, and digital camera are provided, including an image sensor that generates pixel data based on light received through a lens that permits distortion where a captured image is compressed in a first direction, and an image signal processor that performs re-mosaic processing on the pixel data for correcting distortion occurring in the first direction and to generate re-mosaiced pixel data.

22 Claims, 13 Drawing Sheets

(56) References Cited

U.S. PATENT DOCUMENTS

| | | | |
|---|---|---|---|
| 9,756,266 B2 | 9/2017 | Mills et al. | |
| 10,021,358 B2 | 7/2018 | Onishi et al. | |
| 10,033,986 B2 | 7/2018 | Pitts et al. | |
| 10,148,864 B2 | 12/2018 | Wang et al. | |
| 10,536,623 B2 | 1/2020 | Van Der Sijde | |
| 10,616,467 B2 | 4/2020 | Wang et al. | |
| 10,638,055 B2 | 4/2020 | Galor Gluskin | |
| 11,184,553 B1* | 11/2021 | Liu | G06T 7/593 |
| 2014/0253808 A1* | 9/2014 | Tachi | H04N 9/04557 |
| | | | 348/624 |
| 2015/0312537 A1* | 10/2015 | Solhusvik | H04N 25/134 |
| | | | 348/302 |
| 2018/0041688 A1* | 2/2018 | Johnson | H04N 5/22541 |
| 2018/0343404 A1* | 11/2018 | Hwang | H04N 5/35581 |
| 2019/0222738 A1* | 7/2019 | Galor Gluskin | H04N 23/631 |
| 2019/0342502 A1 | 11/2019 | Van Der Sijde | |
| 2020/0112686 A1 | 4/2020 | Van Der Sijde | |
| 2020/0162673 A1* | 5/2020 | Kanda | H04N 23/667 |
| 2020/0294191 A1* | 9/2020 | Chuang | G06T 3/4015 |
| 2021/0021790 A1* | 1/2021 | Singh | H04N 23/11 |
| 2021/0217134 A1* | 7/2021 | Okamura | H04N 9/07 |
| 2021/0390747 A1* | 12/2021 | Feng | G06T 11/60 |

FOREIGN PATENT DOCUMENTS

| | | |
|---|---|---|
| CN | 110944160 | 3/2020 |
| EP | 3430798 | 1/2019 |
| KR | 1020190008057 | 1/2019 |
| WO | WO-2020111441 A1 * | 6/2020 |

\* cited by examiner

DEVICE FOR IMPROVING IMAGE RESOLUTION IN CAMERA SYSTEM HAVING LENS THAT PERMITS DISTORTION AND OPERATION METHOD THEREOF

CROSS-REFERENCE TO RELATED APPLICATIONS

This application claims priority under 35 U.S.C. § 119 to Korean Patent Application No 10-2020-0136546 filed on Oct. 21, 2020, in the Korean Intellectual Property Office, the disclosures of which are incorporated by reference herein in their entireties.

FIELD

Embodiments of the present disclosure described herein relate to electronic devices, and more particularly, relate to an electronic device for improving image resolution in a camera system including a lens that permits distortion, and an operation method thereof.

DISCUSSION OF RELATED ART

An image sensor may be classified as a charge coupled device (CCD) image sensor, a complementary metal-oxide semiconductor (CMOS) image sensor (CIS), or the like. A CMOS image sensor includes pixels implemented with CMOS transistors, and converts light energy to an electrical signal by using a photoelectric conversion element included in each pixel. The CMOS image sensor obtains information about a captured or photographed image by using the electrical signal generated at each pixel.

Smartphones may be equipped with cameras providing a wider field of view than a classic field of view, such as a cinematic widescreen view. An image may be cropped to obtain an image having a greater width compared to an aspect ratio of an image sensor. In this case, the field of view of the cropped image is narrowed, and a portion of an original image is discarded in the image cropping process. For this reason, it may be more difficult to secure a wider field of view as intended by a user.

A wider field of view may be secured by using a lens that permits greater image distortion. To obtain an image having an aspect ratio with a wider field of view as intended by the user, such image distortion may be addressed.

SUMMARY

Embodiments of the present disclosure provide an electronic device for improving image resolution through re-mosaic processing using an image sensor of a multi-pixel structure, in a camera system including a lens that permits distortion, and an operation method thereof.

According to an embodiment, an electronic device includes an image sensor that generates pixel data based on light received through a lens that permits distortion where a captured image is compressed in a first direction, and an image signal processor that performs re-mosaic processing on the generated pixel data for correcting distortion occurring in the first direction and to generate re-mosaiced pixel data.

According to an embodiment, an electronic device includes an image sensor that generates pixel data based on light received through a lens that permits distortion where a captured image is compressed in a first direction, and an image signal processor that performs re-mosaic processing on the pixel data for correcting distortion occurring in the first direction and to generate re-mosaiced pixel data. The pixel array includes a first unit pixel including a first plurality of sub-pixels sharing a first floating diffusion region and a first color filter, a second unit pixel including a second plurality of sub-pixels sharing a second floating diffusion region and a second color filter, and a third unit pixel including a third plurality of sub-pixels sharing a third floating diffusion region and a third color filter.

According to an embodiment, a method of processing signals output from an image sensor, which includes a first unit pixel including a first plurality of sub-pixels and a first color filter, a second unit pixel including a second plurality of sub-pixels and a second color filter, and a third unit pixel including a third plurality of sub-pixels and a third color filter, includes obtaining pixel values from the plurality of sub-pixels, based on light received through a lens that permits distortion where a captured image is compressed in a first direction, generating pixel data by performing correlated double sampling on the pixel values, and generating re-mosaiced pixel data by performing, on the pixel data, re-mosaic processing for correcting distortion occurring in the first direction.

According to an embodiment, a digital camera includes: a lens that permits compression of incident light in a first direction; an image sensor configured to generate pixel data based on the incident light received through the lens; and an image signal processor configured to generate re-mosaiced pixel data by decompressing the generated pixel data in the first direction.

The image sensor may include: a first unit pixel including a first plurality of sub-pixels sharing a first floating diffusion region; a second unit pixel including a second plurality of sub-pixels sharing a second floating diffusion region; and a third unit pixel including a third plurality of sub-pixels sharing a third floating diffusion region, wherein the image signal processor is configured to re-mosaic sub-pixels of the first, second and third pluralities to be adjacent to each other in only the first direction.

BRIEF DESCRIPTION OF THE DRAWINGS

The above and other embodiments of the present disclosure will become apparent by describing in detail embodiments thereof with reference to the accompanying drawings.

DETAILED DESCRIPTION

Below, embodiments of the present disclosure are described in detail such that those skilled in the art may easily implement the described and other embodiments of the present disclosure.

Components that are described in the detailed description with reference to the terms "unit", "module", "block", or the like, and function blocks illustrated in drawings may be implemented with software, hardware, or a combination thereof. For example, the software may include machine code, firmware, embedded code, application software, or a combination thereof. For example, the hardware may include an electrical circuit, an electronic circuit, a processor, a computer, an integrated circuit, integrated circuit cores, an image sensor, a pressure sensor, an inertial sensor, a microelectromechanical system (MEMS), a passive element, or a combination thereof.

Figure 1:
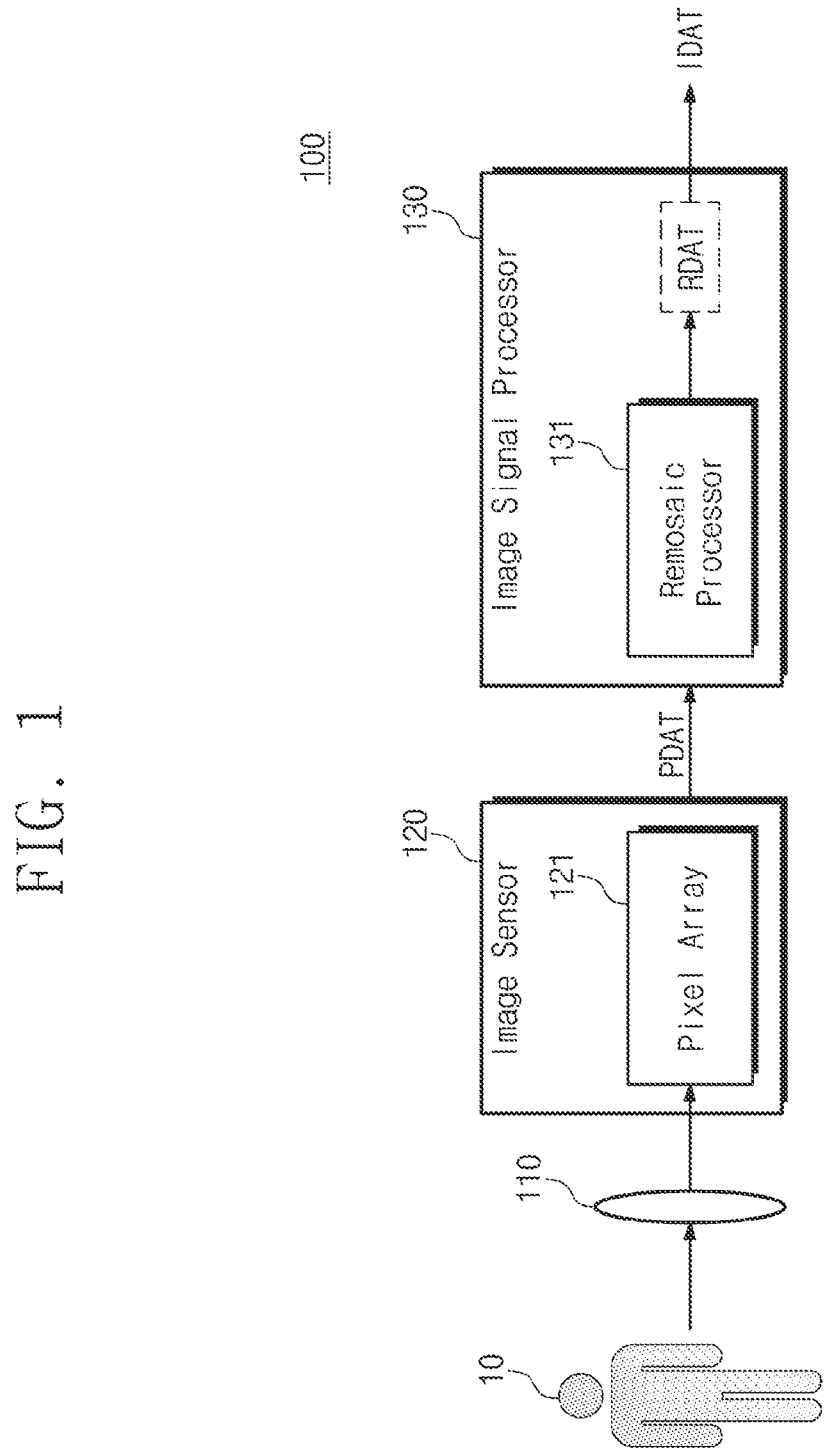
FIG. 1 is a block diagram illustrating a configuration of an image processing portion according to an embodiment of the present disclosure.

FIG. 1 illustrates a configuration of an image processing block 100 according to an embodiment of the present disclosure. The image processing block 100 may be implemented as a part of various electronic devices such as a smartphone, a digital camera, a laptop computer, a desktop computer, or the like. The image processing block 100 may include a lens 110, an image sensor 120, and an image signal processor 130.

Light may be received from an object or scene 10 targeted by the lens 110, which may receive reflected light. In particular, the lens 110 that is used in an embodiment of the present disclosure may secure a wide field of view but may permit distortion in that an image is compressed in a first direction where a field of view widens. For example, the lens 110 may be an anamorphic lens that secures a wide field of view in a specific direction but permits the distortion in that an image is compressed in the specific direction, such as such as where a field of view widens. Below, it may be assumed that a direction where distortion due to the lens 110 is made is the same as a direction where a field of view widens due to the lens 110, without limitation thereto.

The image sensor 120 may generate an electrical signal based on the light received through the lens 110. For example, the image sensor 120 may be implemented with a complementary metal-oxide semiconductor (CMOS) image sensor or the like. For example, the image sensor 120 may be a multi-pixel image sensor having a dual pixel structure or a tetra cell structure.

The image signal processor 130 may generate image data associated with the light captured from the scene 10 by appropriately processing the electrical signal generated by the image sensor 120. In the following description, the scene 10 may include background, a scenery, or the like as well as typically a target reflecting or emitting light to be captured by the image sensor 120.

The image sensor 120 may include a pixel array 121. Pixels of the pixel array 121 may convert light to electrical signals to generate pixel values. The image sensor 120 may perform correlated double sampling (CDS) on the pixel values to generate pixel data PDAT. In particular, because the lens 110 of the present disclosure permits distortion, the pixel data PDAT may indicate an image where distortion occurs. For example, in a case where the lens 110 is an anamorphic lens that permits distortion in a direction where a field of view widens, the pixel data PDAT may indicate an image in which distortion occurs in the direction where the field of view widens. In the present disclosure, an image or data where distortion occurs means an image or data generated based on light received through a lens that permits distortion.

The image signal processor 130 may include a re-mosaic processor 131. The re-mosaic processor 131 may perform distortion correction on the pixel data PDAT in a direction where distortion occurs and may generate re-mosaiced pixel data RDAT. For example, the re-mosaic processor 131 may perform re-mosaic processing on the pixel data PDAT in the direction where distortion occurs.

For example, the re-mosaic processor 131 may perform re-mosaic processing on the pixel data PDAT, which indicates an image where distortion occurs in a direction where a field of view widens, in a direction where the distortion occurs, and may generate the re-mosaiced pixel data RDAT. In this case, the re-mosaiced pixel data RDAT may indicate an image in which a resolution in the direction where distortion occurs is improved by correcting the distortion due to the lens 110.

For example, the re-mosaic processing may include a process of elongating, such as such as upscaling a size of the pixel data PDAT in the direction where distortion occurs and performing interpolation based on a value of the pixel data PDAT. In contrast, the re-mosaic processor 131 may not perform re-mosaic processing in a direction where distortion does not occur, such as, such as a direction where a field of view does not widen.

The image signal processor 130 may generate image data IDAT associated with the scene 10, based on the re-mosaiced pixel data RDAT. To this end, the image signal processor 130 may perform the following processing on the re-mosaiced pixel data RDAT: color correction, auto white balance, gamma correction, color saturation correction, bad pixel correction, and hue correction.

One lens 110 and one image sensor 120 are illustrated in FIG. 1. However, in another embodiment, the image processing block 100 may include a plurality of lenses and a plurality of image sensors. In this case, the plurality of lenses may have different fields of view and may cause different distortion. The plurality of image sensors may have different functions, different performances, and/or different characteristics, and configurations or structures of pixel arrays respectively included in the plurality of image sensors may be different. In addition, the image sensor 120 may further include an analog-to-digital converter (ADC), a counter, a buffer, or the like, such as for performing correlated double sampling (CDS).

In addition, although FIG. 1 shows a case where the re-mosaic processor 131 is implemented within the image processing block 100 in the form of hardware, the present disclosure is not limited thereto. In another embodiment, the re-mosaic processor 131 of FIG. 1 may be implemented on a main processor such as an application processor independent of the image processing block 100, in the form of software. An embodiment where the re-mosaic processor 131 is implemented on an application processor in the form of software will be described with reference to FIG. 11.

Figure 2:
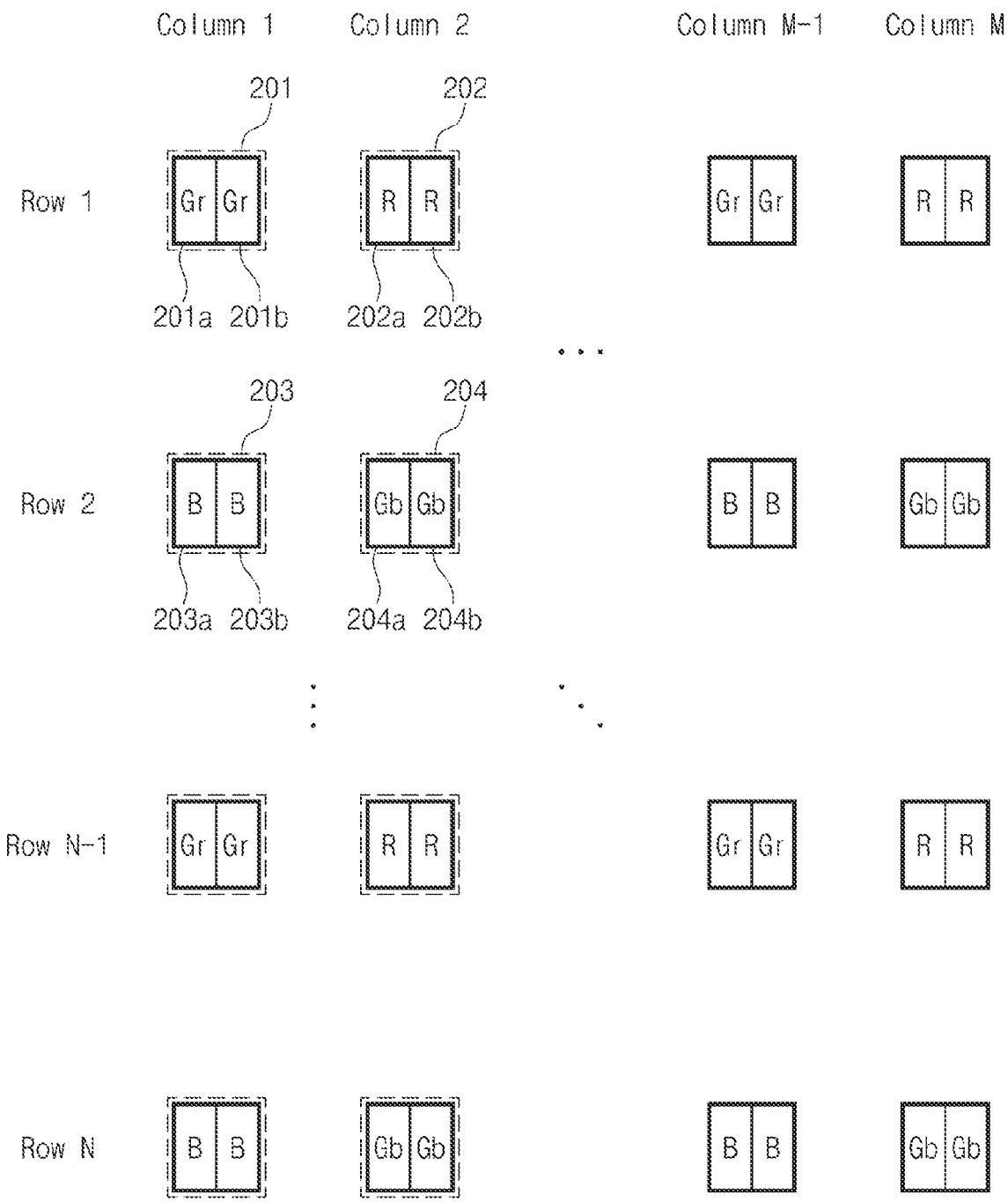
FIG. 2 is a block diagram illustrating a configuration of a pixel array of FIG. 1.

FIG. 2 illustrates a configuration of the pixel array 121 of FIG. 1. A pixel array 200 may include a plurality of unit pixels such as 201 to 204 arranged in a matrix with M columns and N rows, where M and N are integers.

Each of the plurality of unit pixels may include a color filter. For example, each of the plurality of unit pixels may include a red filter passing a red light of a red spectrum, a green filter passing light of a green spectrum, or a blue filter passing light of a blue spectrum. In FIG. 2, each of the unit pixel 201 and the unit pixel 204 includes a green filter, the unit pixel 202 includes a red filter, and the unit pixel 203 includes a blue filter. In the following description, a pixel including a green filter is indicated as a Gr pixel or a Gb pixel, a pixel including a red filter is indicated as an R pixel, and a pixel including a blue filter is indicated as a B pixel.

The plurality of unit pixels of the pixel array 200 may be arranged in the form of a Bayer pattern. For example, the Gr pixel and the R pixel may be alternately disposed at each of odd-numbered rows such as a first row and a third row of the pixel array 200. For example, the B pixel and the Gb pixel may be alternately disposed at each of even-numbered rows such as a second row and a fourth row of the pixel array 200.

Each of the plurality of unit pixels such as 201 to 204 of the pixel array 200 may include two sub-pixels such as two of 201a to 204b. Two sub-pixels such as 201a and 201b constituting one unit pixel such as 201 may share one micro lens and may include the same color filter. That is, the pixel array 200 may have a dual pixel structure. Each sub-pixel may include a photoelectric conversion element such as a photo diode. In FIG. 2, a bold solid line indicates a unit pixel, and a thin solid line indicates a sub-pixel.

Two sub-pixels such as 201a and 201b constituting one unit pixel such as 201 may share one floating diffusion region or may include floating diffusion regions, respectively. Each sub-pixel may output an analog signal, and the analog signal output from each sub-pixel may be converted to a digital signal by an analog-to-digital converter (ADC). The pixel data PDAT may be a set of signals output from respective sub-pixels.

In a case where unit pixels of the pixel array 200 are arranged in the form of a matrix with M columns and N rows, a size of the pixel data PDAT may be expressed by "M×N". In the following description, in a case where a size of image data is expressed by "M×N", the image data indicate an image that is expressed by unit pixels arranged in the form of a matrix with M columns and N rows.

FIG. 2 shows a case where each sub-pixel occupies a space of the same size such as a size of a space occupied by the sub-pixel 201a and a size of a space occupied by the sub-pixel 201b are the same. However, the present disclosure is not limited thereto. For example, in another embodiment, sub-pixels may occupy spaces of different sizes such as a space occupied by the sub-pixel 201a is wider than a space occupied by the sub-pixel 201b.

Figure 3:
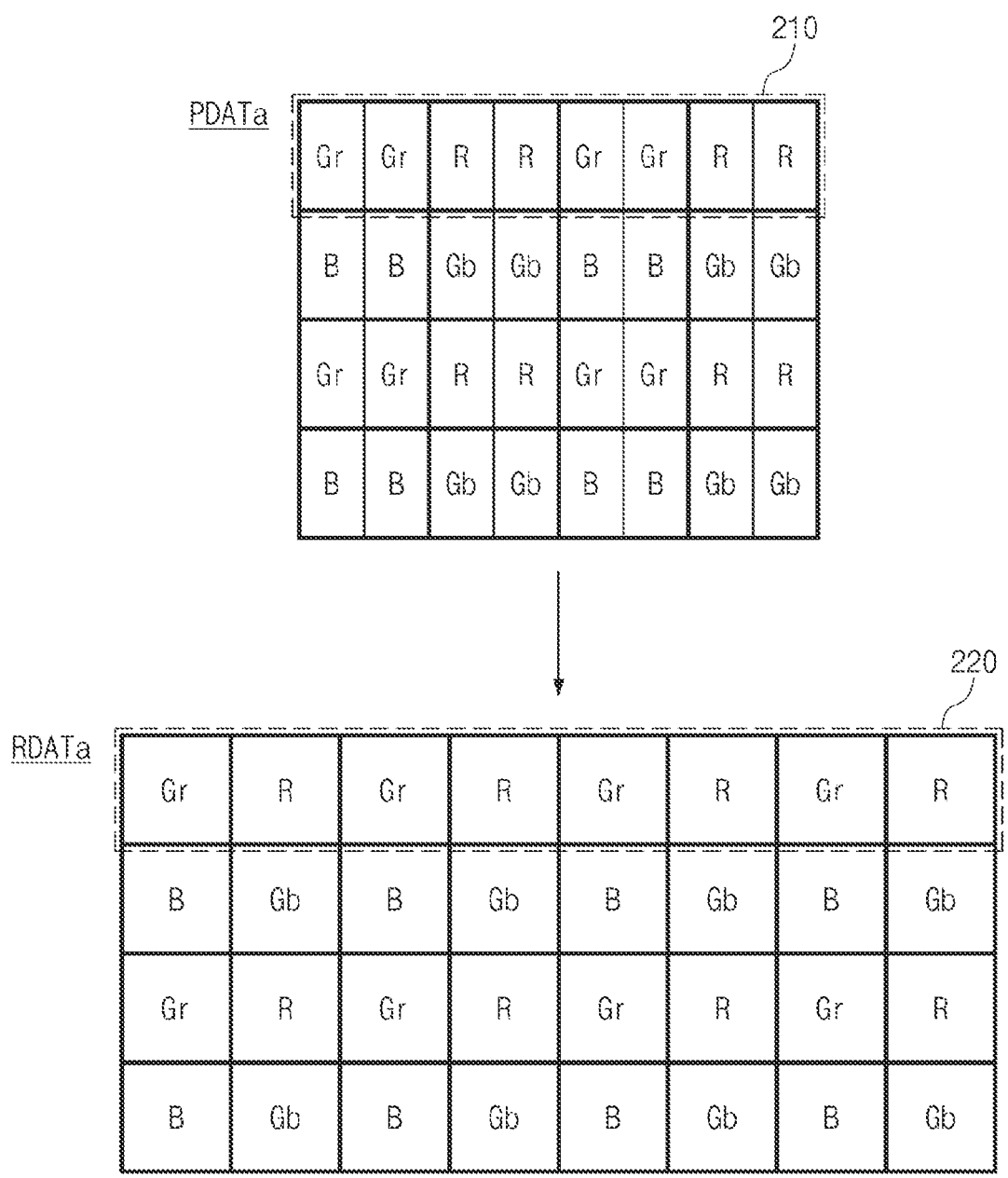
FIG. 3 is a block diagram illustrating re-mosaic processing associated with pixel data output from an image sensor including a pixel array of FIG. 2.

FIG. 3 illustrates re-mosaic processing associated with the pixel data PDAT output from the image sensor 120 including the pixel array 200 of FIG. 2. An embodiment is illustrated in FIG. 3 has a size of pixel data PDATa that is 4×4 and a size of re-mosaiced pixel data RDATa that is 8×4, but the present disclosure is not limited thereto. Below, description will be provided with reference to FIGS. 1 to 3, taken together.

Because each unit pixel of the pixel array 200 includes two sub-pixels, image data output from each unit pixel of the pixel array 200 may include pixel values output from two sub-pixels constituting each unit pixel. Accordingly, the pixel data PDATa may include pixel values output from respective sub-pixels of the pixel array 200.

The re-mosaic processor 131 may perform re-mosaic processing on the pixel data PDATa in a direction where distortion occurs, such as a direction where a field of view widens and may generate the re-mosaiced pixel data RDATa. In other words, an image that the re-mosaiced pixel data RDATa indicate may be an image in which a data size is enlarged in the direction where distortion occurs, such as is upscaled in the direction where distortion occurs), compared to an image that the pixel data PDATa indicate.

Pixel values of the re-mosaiced pixel data RDATa may be determined based on pixel values of the pixel data PDATa, such as pixel values output from respective sub-pixels constituting the pixel array 200. For example, pixel values of a first row 220 of the re-mosaiced pixel data RDATa may be determined by performing interpolation based on pixel values of a first row 210 of the pixel data PDATa. As the above re-mosaic processing is performed, the re-mosaiced pixel data RDAT may indicate an image in which a resolution in the direction where distortion occurs is improved by correcting the distortion due to the lens 110.

Figure 4:
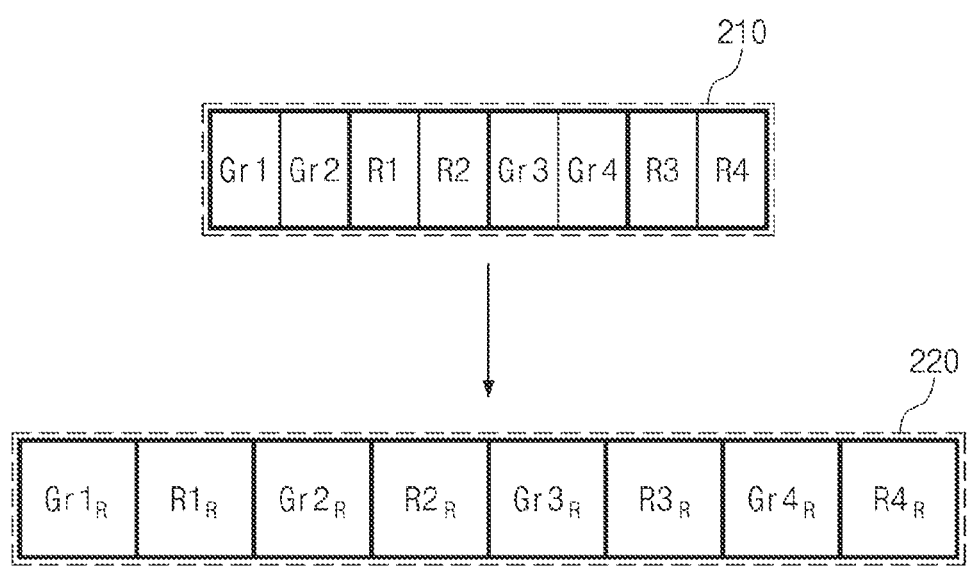
FIG. 4 is a block diagram illustrating a method to perform re-mosaic processing of FIG. 3.

FIG. 4 illustrates a method to perform re-mosaic processing of FIG. 3. In detail, FIG. 4 shows a process where pixel values of the first row 220 of the re-mosaiced pixel data RDATa of FIG. 3 are generated by performing re-mosaic processing on the first row 210 of the pixel data PDATa of FIG. 3. Below, the description will be given with reference to FIGS. 1, 2, and 4 together.

The first row 210 of the pixel data PDATa may include 8 pixel values Gr1 to R4 output from 4 unit pixels, such as 8 sub-pixels. The first row 220 of the re-mosaiced pixel data RDATa may include 8 pixel values $Gr1_R$ to $R4_R$. The re-mosaic processor 131 may determine the pixel values of the first row 220 of the re-mosaiced pixel data RDATa based on the pixel values of the first row 210 of the pixel data PDATa. For example, the re-mosaic processor 131 may determine the pixel values $Gr1_R$ to $R4_R$ of the first row 220 of the re-mosaiced pixel data RDATa by performing interpolation based on the pixel values Gr1 to R4 of the first row 210 of the pixel data PDATa.

Gr pixel values, Gb pixel values, R pixel values, and B pixel values of the re-mosaiced pixel data RDATa may be determined based on Gr pixel values, Gb pixel values, R pixel values, and B pixel values of the pixel data PDATa. For example, the pixel value $Gr1_R$ of the re-mosaiced pixel data RDATa may be the same as the pixel value Gr1 of the pixel data PDATa. Likewise, the pixel value $R2_R$, the pixel value $Gr3_R$, and the pixel value $R4_R$ of the re-mosaiced pixel data RDATa may be the same as the pixel value R2, the pixel value Gr3, and the pixel value R4 of the pixel data PDATa, respectively.

For example, the pixel value $Gr2_R$ of the re-mosaiced pixel data RDATa may be determined based on the pixel value Gr2 and the pixel value Gr3 of the pixel data PDATa, where Gr2 is weighted more than Gr3 because $Gr2_R$ is closer in the first direction to Gr2 than to Gr3, without limitation thereto.

$$Gr2_R = \frac{2*Gr2 + 1*Gr3}{3} \qquad \text{[Equation 1]}$$

As in the above method of determining the pixel value $Gr2_R$, the pixel value $R1_R$, the pixel value $R3_R$, and the pixel value $Gr4_R$ may be similarly determined based on pixel values of the pixel data PDATa. However, the present disclosure is not limited thereto. For example, pixel values of the re-mosaiced pixel data RDATa may be determined by a method different from the above method.

Figure 5:
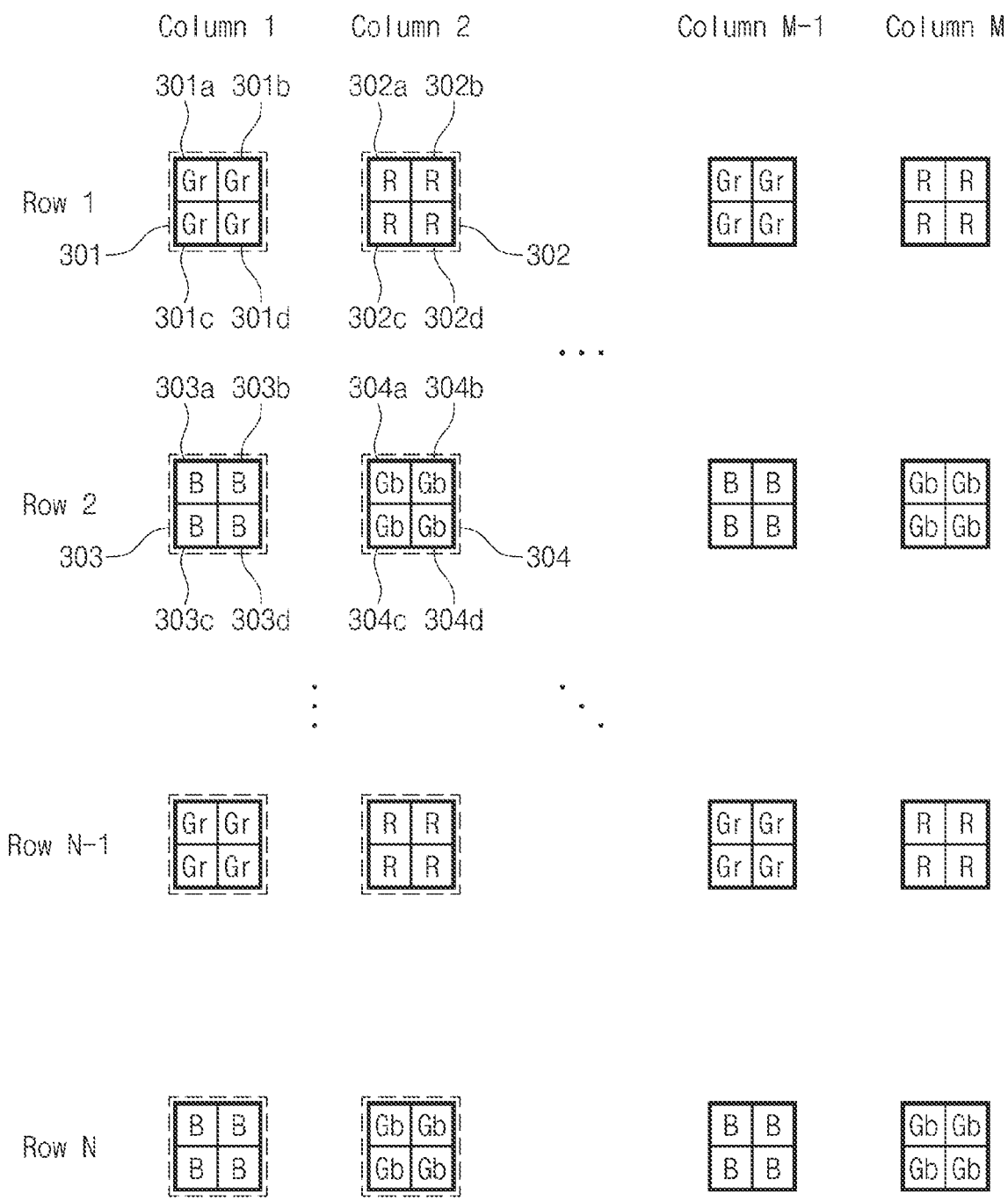
FIG. 5 is a block diagram illustrating FIG. 1

FIG. 5 illustrates another configuration of the pixel array 121 of FIG. 1. A pixel array 300 may include a plurality of unit pixels such as 301 to 304 arranged in an N×M matrix, where M and N are integers.

Each of the plurality of unit pixels may include a color filter. In FIG. 5, each of the unit pixel 301 and the unit pixel 304 includes a green filter, the unit pixel 302 includes a red filter, and the unit pixel 303 includes a blue filter. The plurality of unit pixels of the pixel array 300 may be arranged in the form of a Bayer pattern.

Each of the plurality of unit pixels such as 301 to 304 of the pixel array 300 may include 4 sub-pixels such as four of 301a to 304d. 4 sub-pixels such as 301a to 301d constituting one unit pixel such as 301 may have the same color filter. That is, the pixel array 300 may be implemented in a tetra cell structure. Each sub-pixel may include a photoelectric conversion element such as a photo diode. In addition, each sub-pixel may include a micro lens 4 sub-pixels such as 301a to 301d constituting one unit pixel such as 301 may share one floating diffusion region.

Each sub-pixel may output an analog signal, and the analog signal output from each sub-pixel may be converted into a digital signal by an analog-to-digital converter. The pixel data PDAT may be a set of signals output from respective sub-pixels.

Figure 6:
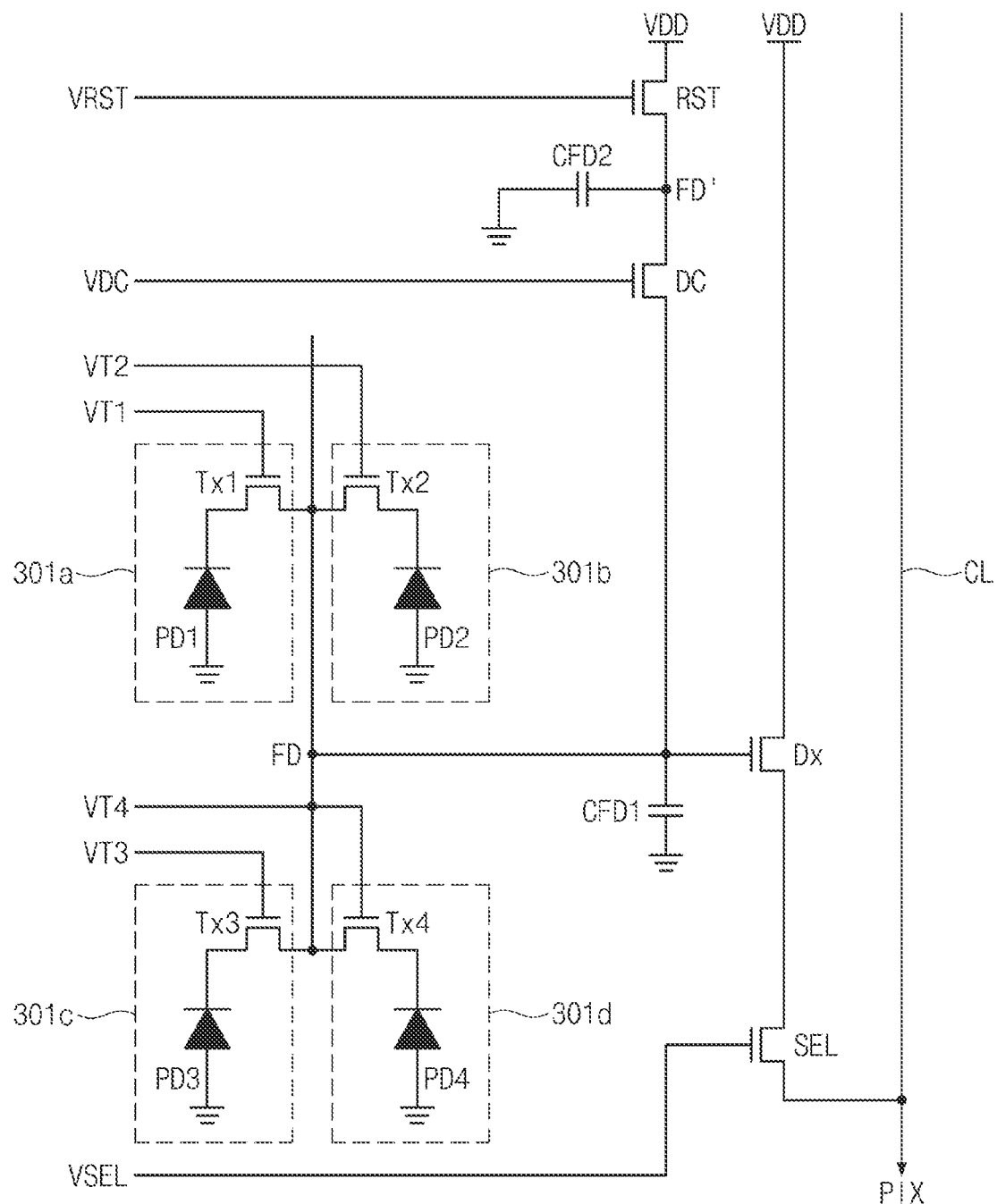
FIG. 6 is a circuit diagram illustrating one of the unit pixels of FIG. 5.

FIG. 6 illustrates a circuit diagram of one of the unit pixels of FIG. 5. For example, the unit pixel 301 may include photoelectric conversion elements PD1 to PD4, transfer transistors Tx1 to Tx4, a reset transistor RST, a dual conversion transistor DC, a drive transistor Dx, and a select transistor SEL. The unit pixel 301 may include the sub-pixels 301a to 301d.

In this embodiment, although the sub-pixel 301a is closer in a first direction to the sub-pixel 301b than it is in a second direction to the sub-pixel 301c, which may be particularly applicable to securing images with wider fields of view in the first direction, embodiments are not limited thereto. For example, in alternate embodiments, the sub-pixel 301a may be is farther in the first direction from the sub-pixel 301b than it is in the second direction from the sub-pixel 301c, or it may be substantially equidistant to the sub-pixel 301b and the sub-pixel 301c.

Moreover, although the sub-pixel 301a is substantially horizontally aligned in a first direction with the sub-pixel 301b and substantially vertically aligned in a second direction with the sub-pixel 301c, embodiments are not limited thereto. For example, in alternate embodiments, the sub-pixel 301a may be horizontally aligned with the sub-pixel 301b but vertically staggered with the sub-pixel 301c, horizontally staggered with the sub-pixel 301b but vertically aligned with the sub-pixel 301c, or horizontally staggered with the sub-pixel 301b and vertically staggered with the sub-pixel 301c.

The first sub-pixel 301a may include the first photoelectric conversion element PD1 and the first transfer transistor Tx1, and each of the remaining sub-pixels 301b, 301c, and 301d may include elements similar to those of the first sub-pixel 301a. Each of the sub-pixels 301a to 301d may share the reset transistor RST, the dual conversion transistor DC, the drive transistor Dx, and the select transistor SEL. In addition, as described with reference to FIG. 5, the sub-pixels 301a to 301d may share a floating diffusion region FD.

The dual conversion transistor DC may be driven by a dual conversion signal VDC. When the dual conversion transistor DC is turned off, the floating diffusion region FD may be connected with a first floating diffusion capacitor CFD1. In this case, a capacitance of the floating diffusion region FD may correspond to a capacitance of the first floating diffusion capacitor CFD1.

When the dual conversion transistor DC is turned on, the floating diffusion region FD may be connected with a second floating diffusion capacitor CFD2, as well as the first floating diffusion capacitor CFD1. An expanded floating diffusion region FD' indicates a floating diffusion region when the dual conversion transistor DC is turned on. The second floating diffusion capacitor CFD2 may be provided to prevent saturation. For example, the floating diffusion capacitors CFD1 and CFD2 may be a parasitic capacitor and/or a capacitor element.

The transfer transistors Tx1 to Tx4 may be respectively driven by transfer signals VT1 to VT4 and may transfer charges generated or integrated by the photoelectric conversion elements PD1 to PD4 to the floating diffusion region FD or the expanded floating diffusion region FD'. For example, first ends of the transfer transistors Tx1 to Tx4 may be respectively connected with the photoelectric conversion elements PD1 to PD4, and second ends of the transfer transistors Tx1 to Tx4 may be connected in common with the floating diffusion region FD.

The floating diffusion region FD or the expanded floating diffusion region FD' may integrate charges corresponding to the amount of incident light. While the transfer transistors Tx1 to Tx4 are respectively turned on by the transfer signals VT1 to VT4, the floating diffusion region FD or the expanded floating diffusion region FD' may integrate charges provided from the photoelectric conversion elements PD1 to PD4. Because the floating diffusion region FD is connected with a gate terminal of the drive transistor Dx operating as a source follower amplifier, a voltage corresponding to the integrated charges may be formed at the floating diffusion region FD.

The reset transistor RST may be driven by a reset signal VRST and may provide a power supply voltage VDD to the floating diffusion region FD or the extended floating diffusion region FD'. As such, the charges integrated at the floating diffusion region FD or the extended floating diffusion region FD' may move to a terminal for a power supply voltage such as VDD, and a voltage of the floating diffusion region FD or the extended floating diffusion region FD' may be reset.

The drive transistor Dx may amplify the voltage of the floating diffusion region FD or the extended floating diffusion region FD' applied to its gate terminal, up to a voltage such as VDD applied to its input terminal, to generate a pixel signal PIX. The select transistor SEL may be driven by a selection signal VSEL and may select a pixel to be read in units of a row. When the select transistor SEL is turned on, the pixel signal PIX may be output through a column line CL.

Figure 7:
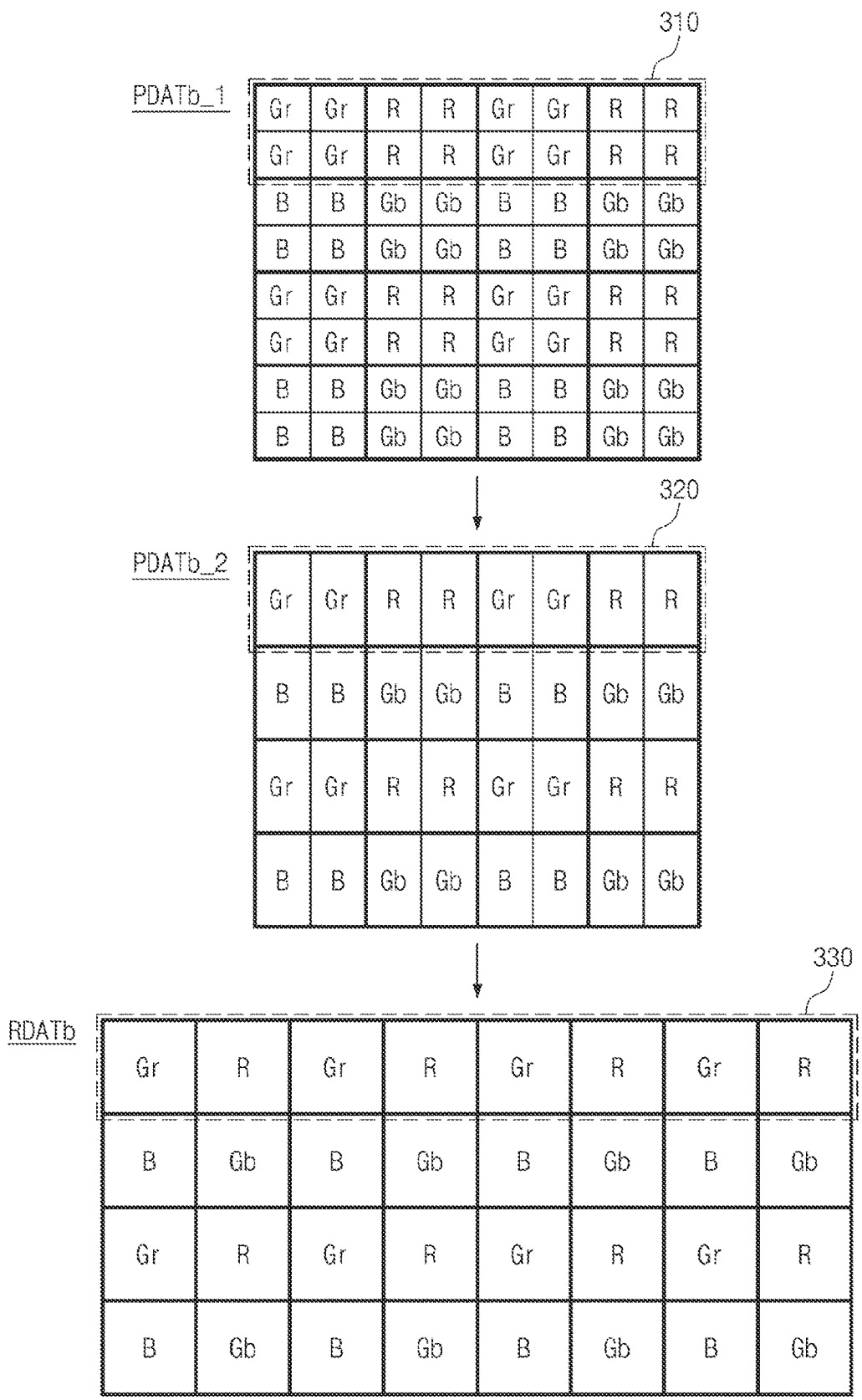
FIG. 7 is a block diagram illustrating digital binning associated with first pixel data output from an image sensor including a pixel array of FIG. 5 and re-mosaic processing associated with second pixel data.

FIG. 7 illustrates digital binning associated with first pixel data PDATb_1 output from the image sensor 120 including the pixel array 300 of FIG. 5 and re-mosaic processing associated with second pixel data PDATb_2. An embodiment is illustrated in FIG. 5 as a size of each of first pixel data PDATb_1 and second pixel data PDATb_2 is 4×4 and a size of re-mosaiced pixel data RDATb is 8×4, but the present disclosure is not limited thereto. Below, the description will be given with reference to FIGS. 1, 5, and 7 together.

Because each unit pixel of the pixel array 300 includes four sub-pixels, image data output from each unit pixel of the pixel array 300 may include pixel values output from four sub-pixels constituting each unit pixel. Accordingly, the first pixel data PDATb_1 may include pixel values output from respective sub-pixels of the pixel array 300.

The second pixel data PDATb_2 may be generated as a result of performing digital binning on the pixel values of the first pixel data PDATb_1 in a direction where distortion does not occur, such as a column direction. For example, the image signal processor 130 may generate the second pixel data PDATb_2 by performing digital binning on the pixel values of the first pixel data PDATb_1 in the direction where distortion does not occur. For example, pixel values of a first row 320 of the second pixel data PDATb_2 may be determined by performing digital binning on the pixel values of a first row 310 of the first pixel data PDATb_1 in the direction where distortion does not occur.

In another embodiment, the image sensor 120 may perform analog binning. Below, a case where analog binning is performed on one such as 301 of unit pixels constituting the pixel array 300 will be described with reference to FIG. 6.

The first transfer transistor Tx1 and the third transfer transistor Tx3 of the unit pixel may be simultaneously turned on, and the unit pixel may output a first pixel signal corresponding to a sum of charges transferred from the first photoelectric conversion element PD1 and the third photoelectric conversion element PD3. Likewise, the second transfer transistor Tx2 and the fourth transfer transistor Tx4 of the unit pixel may be simultaneously turned on, and the unit pixel may output a second pixel signal corresponding to a sum of charges transferred from the second photoelectric conversion element PD2 and the fourth photoelectric conversion element PD4. Each of the first pixel signal and the second pixel signal may be converted to a digital signal by an analog-to-digital converter.

Each of the remaining unit pixels may also output pixel signals each corresponding to a sum of charges, and the output pixel signals may be converted to digital signals, respectively. A set of digital signals thus converted may be output as pixel data. As such, the pixel array 300 may output pixel data such as pixel data such as the second pixel data PDATb_2 obtained as a result of the analog binning.

The re-mosaic processor 131 may perform re-mosaic processing on the second pixel data PDATb_2 in a direction where distortion occurs, such as a direction where a field of view widens and may generate the re-mosaiced pixel data RDATb. In other words, an image that the re-mosaiced pixel data RDATb indicate may an image in which a data size is enlarged in the direction where distortion occurs, such as is upscaled in the direction where distortion occurs and a data size in a direction where distortion does not occur is equally maintained, compared to an image that the second pixel data PDATb_2 indicate.

Pixel values of the re-mosaiced pixel data RDATb may be determined based on pixel values of the second pixel data PDATb_2, such as pixel values output from respective sub-pixels constituting the pixel array 300. For example, pixel values of a first row 330 of the re-mosaiced pixel data RDATb may be determined by performing interpolation based on pixel values of the first row 320 of the second pixel data PDATb_2. As the above re-mosaic processing is performed, the re-mosaiced pixel data RDATb may indicate an image in which a resolution in the direction where distortion occurs is improved by correcting the distortion due to the lens 110.

Figure 8:
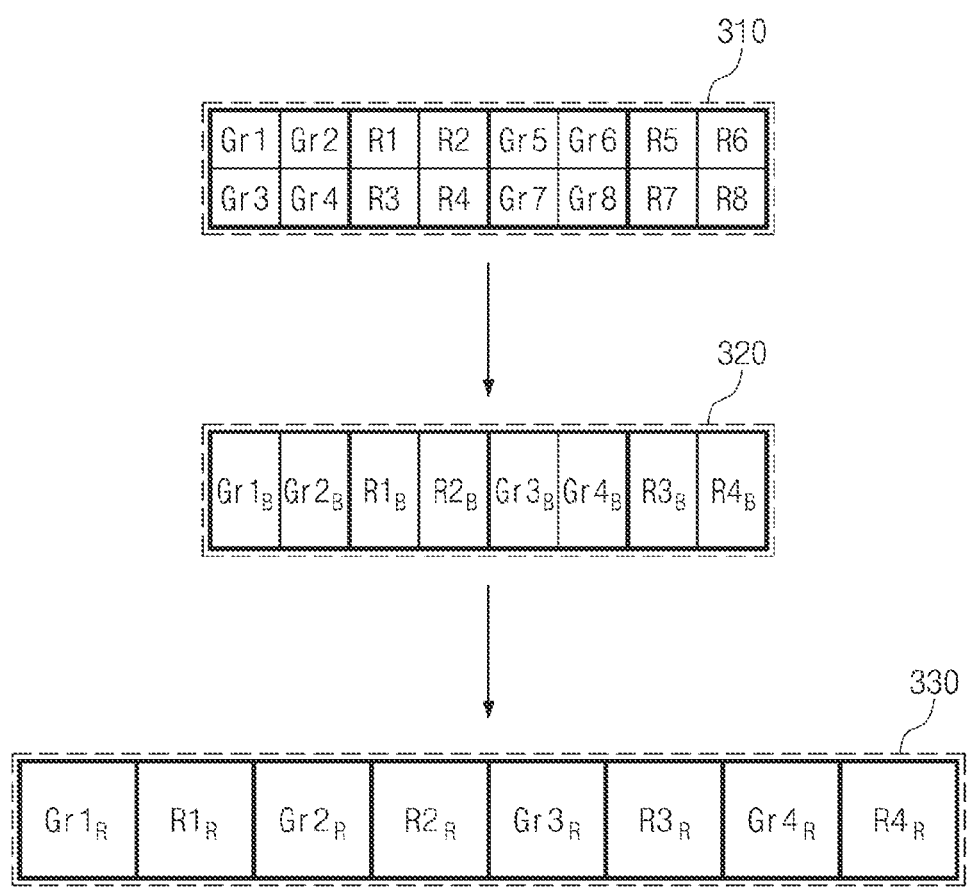
FIG. 8 is a block diagram illustrating a method to perform digital binning and re-mosaic processing of FIG. 7.

FIG. 8 illustrates a method to perform digital binning and re-mosaic processing of FIG. 7. In detail, FIG. 8 shows a process where pixel values of the first row 320 of the second pixel data PDATb_2 of FIG. 7 are generated by performing digital binning on pixel values of the first row 310 of the first pixel data PDATb_1 of FIG. 7 and pixel values of the first row 330 of the re-mosaiced pixel data RDATb of FIG. 7 are generated by performing re-mosaic processing on pixel values of the first row 320 of the second pixel data PDATb_2. Below, the description will be given with reference to FIGS. 1, 5, and 8 together.

The first row 310 of the first pixel data PDATb_1 may include 16 pixel values Gr1 to R8 output from 4 unit pixels, such as 16 sub-pixels. The first row 320 of the second pixel data PDATb_2 may include 8 pixel values $Gr1_B$ to $R4_B$. The first row 330 of the re-mosaiced pixel data RDATb may include 8 pixel values $Gr1_R$ to $R4_R$.

The image signal processor 130 may determine pixel values of the first row 320 of the second pixel data PDATb_2 by performing digital binning on the pixel values of the first row 310 of the first pixel data PDATb_1 in the direction where distortion does not occur, such as a column direction. For example, the pixel value $Gr1_B$ of the second pixel data PDATb_2 may be determined as an average value of the pixel value Gr1 and the pixel value Gr3 of the first pixel data PDATb_1, and the pixel value $Gr2_B$ of the second pixel data PDATb_2 may be determined as an average value of the pixel value Gr2 and the pixel value Gr4 of the first pixel data PDATb_1.

Likewise, each of the remaining pixel values of the second pixel data PDATb_2 may be determined by calculating an average value of pixel values of the first pixel data PDATb_1. However, the present disclosure is not limited thereto. For example, the image signal processor 130 may perform digital binning on pixel values of the first pixel data PDATb_1 by using a method different from the above method.

The re-mosaic processor 131 may determine pixel values of the first row 330 of the re-mosaiced pixel data RDATb based on the pixel values of the first row 320 of the second pixel data PDATb_1. For example, the re-mosaic processor 131 may determine pixel values $Gr1_R$ to $R4_R$ of the first row 330 of the re-mosaiced pixel data RDATb by performing interpolation based on the pixel values $Gr1_B$ to $R4_B$ of the first row 320 of the second pixel data PDATb_2.

A method of performing interpolation based on the pixel values Gr B to $R4_B$ of the first row 320 of the second pixel data PDATb_2 is the same as that described with reference to FIG. 4, and thus, additional description will be omitted to avoid redundancy. However, the present disclosure is not limited thereto. For example, pixel values of the re-mosaiced pixel data RDATb may be determined by a method different from the above method.

FIG. 8 shows a case where the re-mosaic processor 131 performs digital binning on the first pixel data PDATb_1 before re-mosaic processing, but the present disclosure is not limited thereto. In another embodiment, as described with reference to FIGS. 6 and 7, pixel data may be output as a result of performing analog binning. Meanwhile, in another embodiment, both analog binning and digital binning may not be performed, and the re-mosaic processor 131 may perform re-mosaic processing by using all pixel values of the first pixel data PDATb_1.

In addition, the present disclosure is not limited to a case where the image sensor 120 of FIG. 1 is implemented in a dual cell structure of FIG. 2 or a tetra cell structure of FIG. 5. In another embodiment, the pixel array 121 of FIG. 1 may be implemented in a multi-pixel structure where each unit pixel is composed of a plurality of sub-pixels such as 4 or more each including the same color filter. As described with reference to FIGS. 2 and 5, each unit pixel may include a plurality of sub-pixels each including a photoelectric conversion element such as a photo diode. A plurality of sub-pixels constituting one unit pixel may share one floating diffusion region or may share a plurality of floating diffusion regions.

Figure 9:
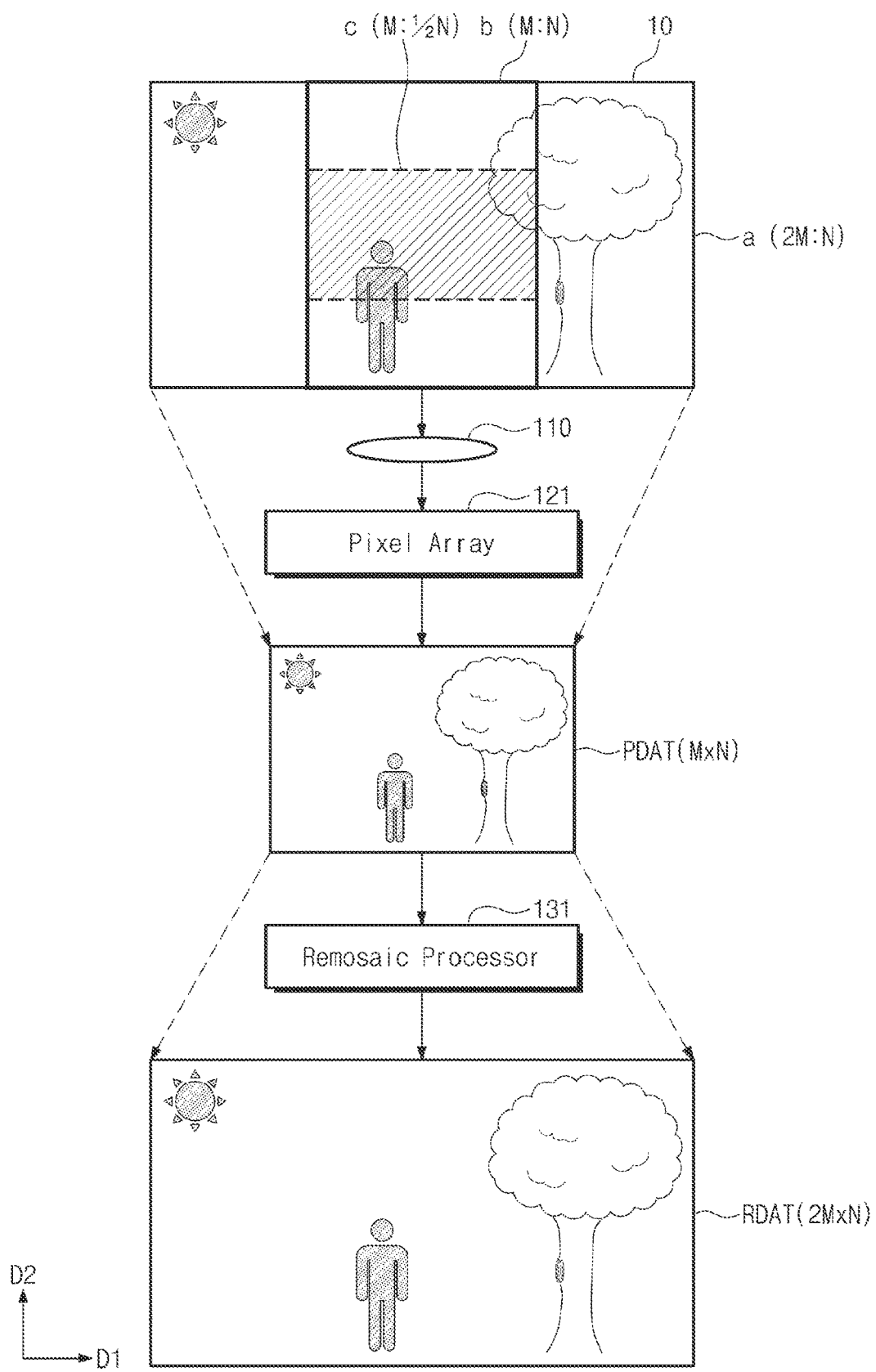
FIG. 9 is a conceptual diagram illustrating a process in which an image resolution is improved by re-mosaic processing according to an embodiment of the present disclosure.

FIG. 9 conceptually illustrates a process in which an image resolution is improved by re-mosaic processing according to an embodiment of the present disclosure.

The lens 110 that is used in an embodiment of the present disclosure may be an anamorphic lens that is capable of securing a wide field of view in direction D1 and permits distortion where an image is compressed in direction D1, such as a direction where a field of view widens with respect to a scene 10. For example, a region "a" having an aspect ratio of 2M:N may be a region that is capable of being captured through the lens 110 used in the embodiment of the present disclosure, and a region "b" having an aspect ratio of M:N may be a region that is capable of being captured through a lens not causing distortion.

The pixel array 121 may generate the pixel data PDAT being electrical signals, based on light received through the lens 110. Because distortion that an image is compressed in direction D1 occurs due to the lens 110, a size of the pixel data PDAT may be "M×N". As described with reference to FIGS. 2 to 8, the re-mosaic processor 131 may perform re-mosaic processing on the pixel data PDAT to generate the re-mosaiced pixel data RDAT. An image that the re-mosaiced pixel data RDAT indicate may an image in which a data size is enlarged from "M" to "2M" in direction D1, such as is upscaled in direction D1), compared to an image that the pixel data PDAT indicate.

In other words, a size of the re-mosaiced pixel data RDAT may be "2M×N", and an aspect ratio may be "2M:N". The re-mosaiced pixel data RDAT may indicate an image in which a resolution in the direction where distortion occurs is improved, such as from "M" to "2M" by correcting the distortion due to the lens 110.

In contrast, to obtain an image having an aspect ratio of 2M:N by using a classic lens not causing distortion, the following operations may be required: capturing the region "b" and then cropping the captured image to correspond to a size of a region "c". Accordingly, an image of a specific aspect ratio obtained by the image sensor 120 of the present disclosure may show a considerably wide region, compared to an image of a specific aspect ratio obtained by a general image sensor.

Figure 10:
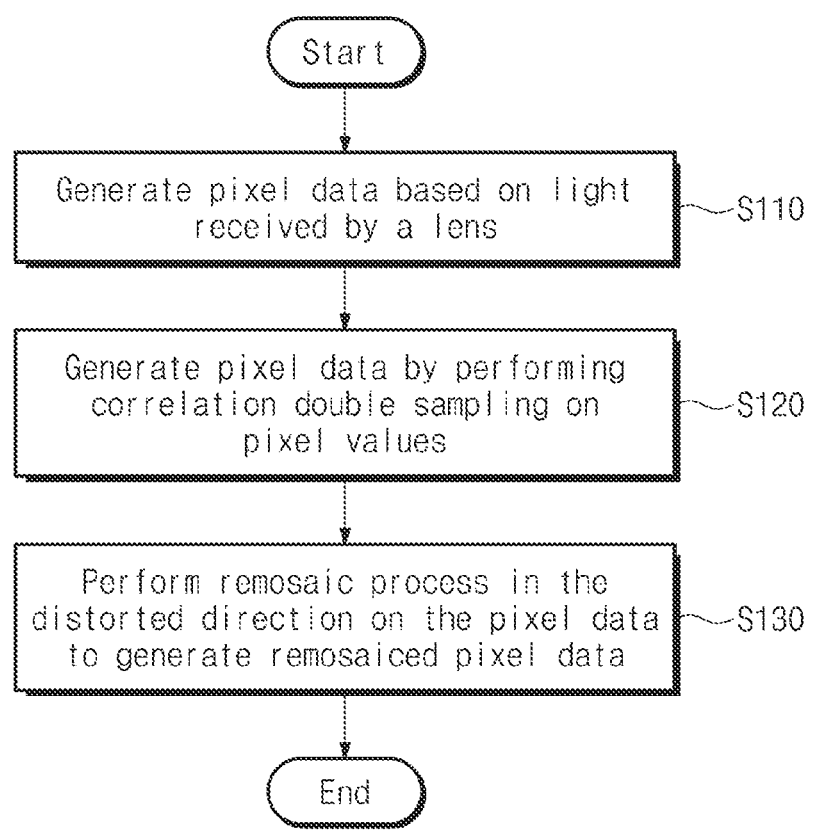
FIG. 10 is a flowchart diagram illustrating an operation method of a device for improving an image resolution, according to an embodiment of the present disclosure.

FIG. 10 is a flowchart illustrating an operation method of a device for improving an image resolution, according to an embodiment of the present disclosure. Below, the description will be given with reference to FIGS. 1 and 10 together.

In operation S110, the pixel array 121 may generate pixel values based on light received through the lens 110. In operation S120, the image sensor 120 may generate the pixel data PDAT by performing correlated double sampling (CDS) on the pixel values generated by the pixel array 121. In particular, because the lens 110 used in the embodiments of the present disclosure permits distortion, the pixel data PDAT may indicate an image where distortion occurs. For example, in a case where the lens 110 is an anamorphic lens that permits distortion in a direction where a field of view widens, the pixel data PDAT may indicate an image where distortion occurs in the direction where a field of view widens.

In operation S130, the re-mosaic processor 131 may perform re-mosaic processing on the pixel data PDAT in the direction where distortion occurs and may generate the re-mosaiced pixel data RDAT. In this case, the re-mosaiced pixel data RDAT may indicate an image in which a resolution in the direction where distortion occurs is improved by correcting the distortion.

Figure 11:
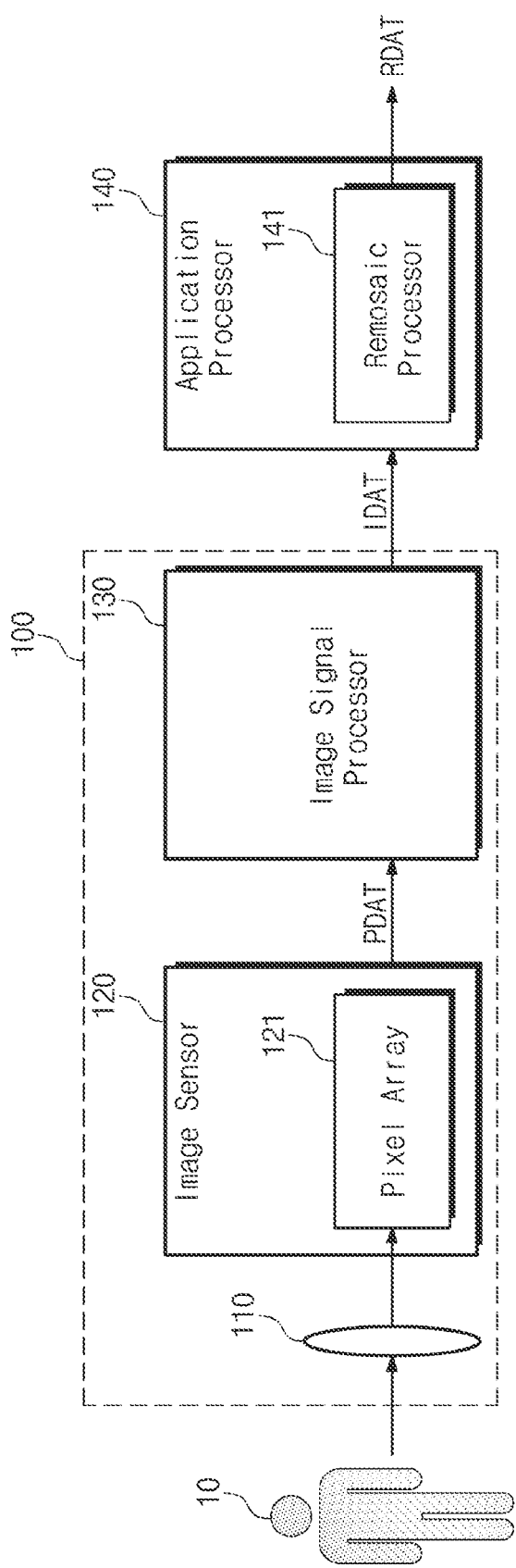
FIG. 11 is a block diagram illustrating a configuration of an image processing block and an application processor, according to another embodiment of the present disclosure.

FIG. 11 is a block diagram illustrating a configuration of the image processing block 100 and an application processor 140, according to another embodiment of the present disclosure. Unlike FIG. 1, FIG. 11 shows an embodiment in which a re-mosaic processor 141 is not included in the image signal processor 130 and is implemented, as software, in the application processor 140 independent of the image processing block 100.

The pixel array 121 may generate the pixel data PDAT based on light received through the lens 110, and the image signal processor 130 may generate the image data IDAT associated with the scene 10 based on the pixel data PDAT. The re-mosaic processor 141 may perform re-mosaic processing on the image data IDAT to generate the re-mosaiced pixel data RDAT. A method of performing re-mosaic processing on the image data IDAT is the same as the method of performing re-mosaic processing on the pixel data PDAT, which is described with reference to FIGS. 2 to 8, except that the re-mosaic processor 141 is included in the application processor 140, and thus, additional description will be omitted to avoid redundancy.

Figure 12:
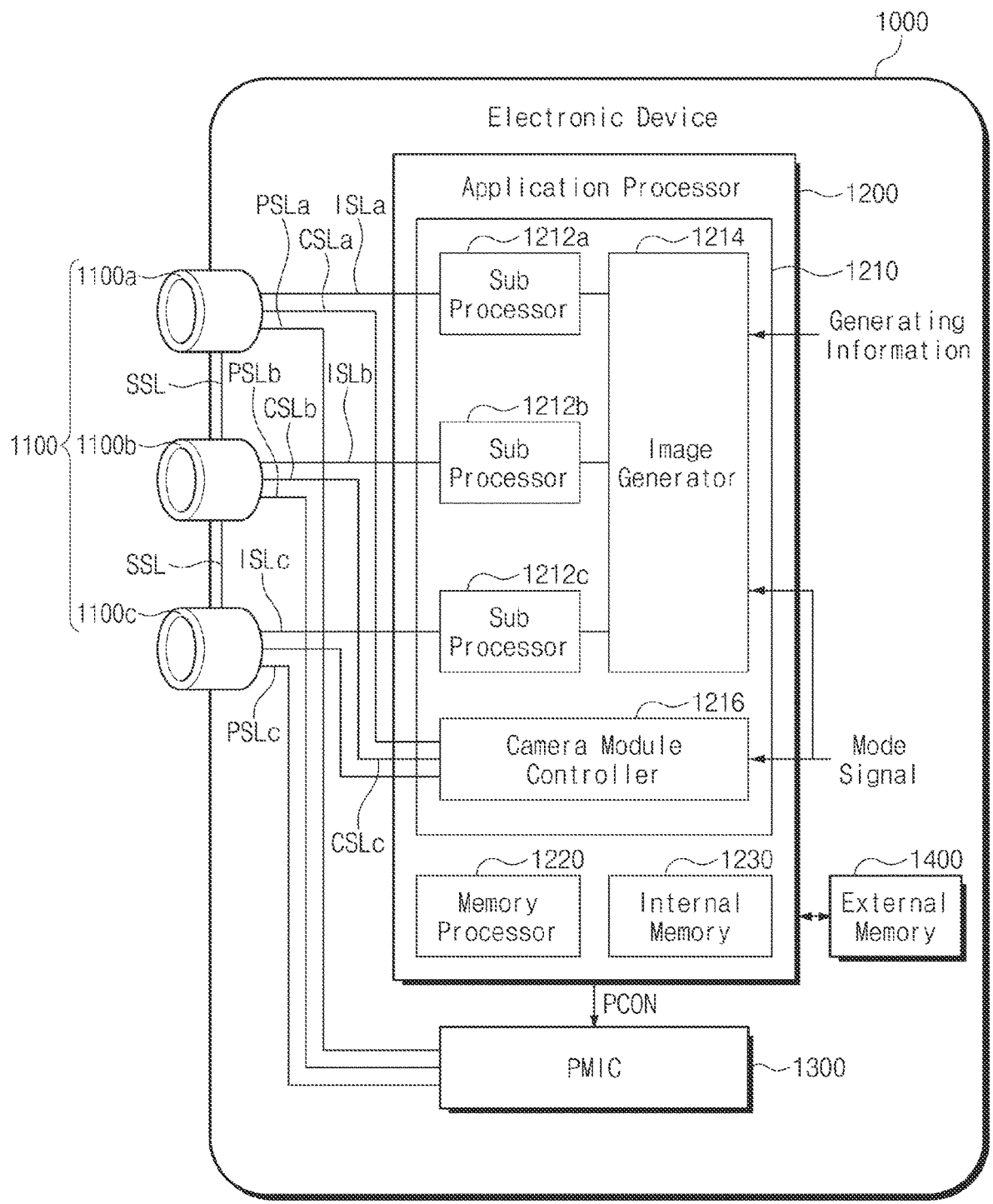
FIG. 12 is a block diagram illustrating a configuration of an electronic device including a multi-camera module where an image resolution improving method according to an embodiment of the present disclosure is adopted.
Figure 13:
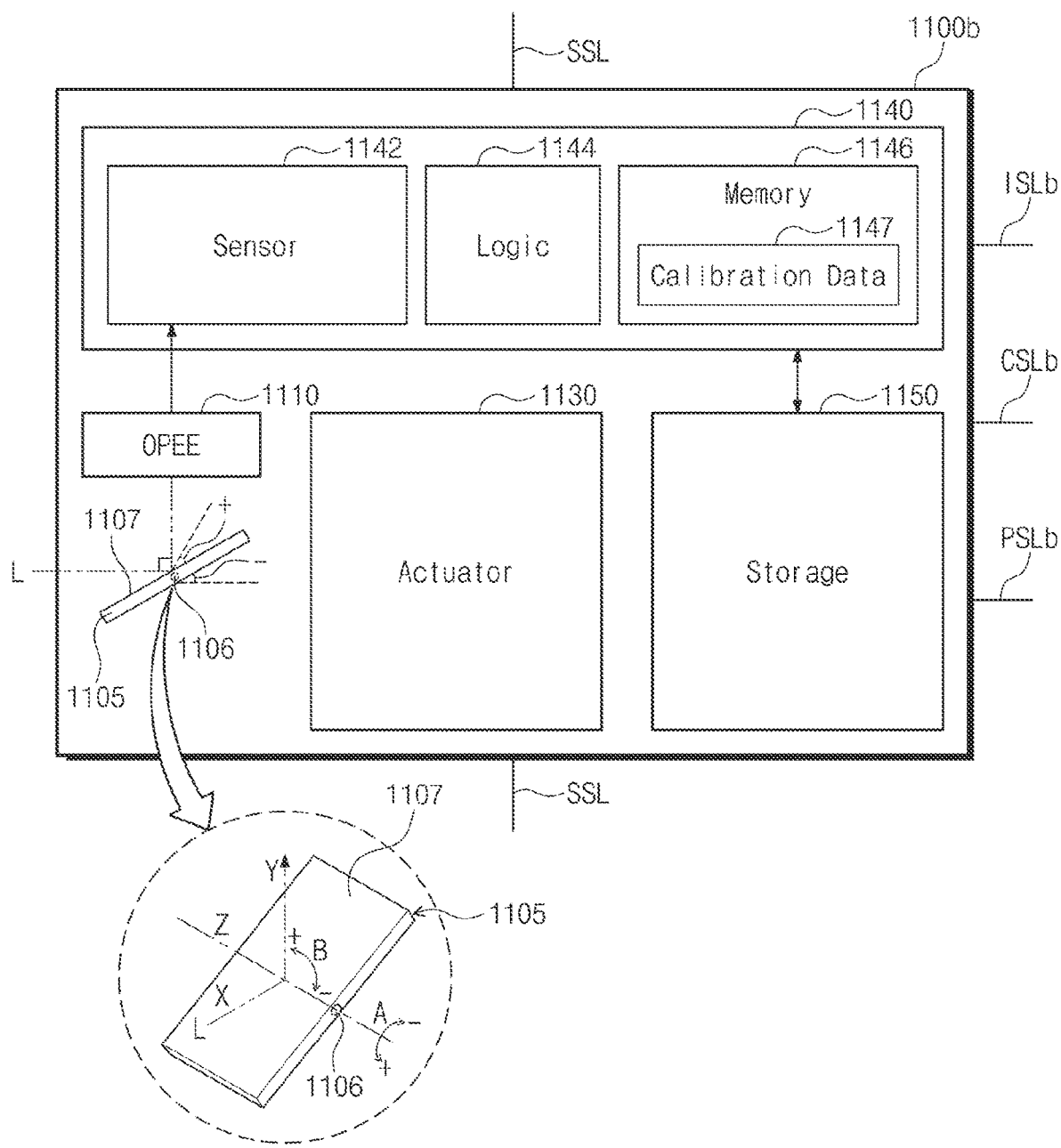
FIG. 13 is a block diagram illustrating a configuration of a camera module of FIG. 12.

FIG. 12 illustrates a configuration of an electronic device including a multi-camera module where an image resolution improving method according to an embodiment of the present disclosure is adopted. FIG. 13 illustrates a configuration of a camera module of FIG. 12.

Referring to FIG. 12, an electronic device 1000 may include a camera module group 1100, an application processor 1200, a PMIC 1300, and an external memory 1400.

The camera module group 1100 may include a plurality of camera modules 1100a, 1100b, and 1100c. An electronic device including three camera modules 1100a, 1100b, and 1100c is illustrated in FIG. 12, but the present disclosure is not limited thereto. In an embodiment, the camera module group 1100 may be modified to include only two camera modules. In addition, in an embodiment, the camera module group 1100 may be modified to include "n" camera modules, where n is a natural number of 4 or more.

Below, a detailed configuration of the camera module 1100b will be more fully described with reference to FIG. 13, but the following description may be equally applied to the remaining camera modules 1100a and 1100c.

Referring to FIG. 13, the camera module 1100b may include a prism 1105, an optical path folding element (OPFE 1110, an actuator 1130, an image sensing device 1140, and storage 1150.

The prism 1105 may include a reflecting plane 1107 of light reflecting material and may change a path of light "L" incident from the outside.

In an embodiment, the prism 1105 may change a path of the light "L" incident in a first direction "X" to a second direction "Y" perpendicular to the first direction "X". In addition, the prism 1105 may change the path of the light "L" incident in the first direction "X" to the second direction "Y" perpendicular to the first direction "X" by rotating the reflecting plane 1107 of the light reflecting material in direction "A" about a central axis 1106 or rotating the central axis 1106 in direction "B". In this case, the OPFE 1110 may move in a third direction "Z" perpendicular to the first direction "X" and the second direction "Y".

In an embodiment, as illustrated, a maximum rotation angle of the prism 1105 in direction "A" may be equal to or smaller than 15 degrees in a positive A direction and may be greater than 15 degrees in a negative A direction, but the present disclosure is not limited thereto.

In an embodiment, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In an embodiment, the prism 1105 may move the reflecting plane 1107 of the light reflecting material in the third direction such as a Z direction parallel to a direction in which the central axis 1106 extends.

The OPFE 1110 may include optical lenses composed of "m" groups (m being a natural number), for example. Here, "m" lens may move in the second direction "Y" to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 5Z or more by moving "m" optical lens included in the OPFE 1110. The OPFE 1110 may further include optical lenses such as an anamorphic lens that are composed of "n" groups (n being a natural number in front of the "m" lenses described above.

The actuator 1130 may move the OPFE 1110 or an optical lens (hereinafter referred to as an "optical lens" to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens. The control logic 1144 may control overall operations of the camera module 1100b. For example, the control logic 1144 may control an operation of the camera module 1100b based on a control signal provided through a control signal line CSLb. In addition, the control logic 1144 may include a re-mosaic processor such as 131 of FIG. 1 for performing re-mosaic processing of the present disclosure.

The memory 1146 may store information, which is necessary for an operation of the camera module 1100b, such as calibration data 1147. The calibration data 1147 may include information necessary for the camera module 1100b to generate image data by using the light "L" provided from the outside. The calibration data 1147 may include, for example, information about the degree of rotation described above, information about a focal length, information about an optical axis, or the like. In a case where the camera module 1100b is implemented in the form of a multi-state camera in which a focal length varies depending on a location of an optical lens, the calibration data 1147 may include a focal length value for each location (or state of the optical lens and information about auto focusing. The calibration data 1147 may include information about a direction where re-mosaic processing of the present disclosure is performed.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In an embodiment, the storage 1150 may be implemented with an electrically erasable programmable read only memory (EE-PROM), but the present disclosure is not limited thereto.

Referring together to FIGS. 12 and 13, in an embodiment, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In an embodiment, one camera module such as 1100b among the plurality of camera modules 1100a, 1100b, and 1100c may be a folded lens shape of camera module in which the prism 1105 and the OPFE 1110 described above are included, and the remaining camera modules such as 1100a and 1100c may be a vertical shape of camera module in which the prism 1105 and the OPFE 1110 described above are not included; however, the present disclosure is not limited thereto.

In an embodiment, one camera module such as 1100c among the plurality of camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module such as 1100a or 1100b and may generate a three-dimensional (3D) depth image.

In an embodiment, at least two camera modules such as 1100a and 1100b among the plurality of camera modules 1100a, 1100b, and 1100c may have different fields of view. In this case, the at least two camera modules such as 1100a and 1100b among the plurality of camera modules 1100a, 1100b, and 1100c may include different optical lens, not limited to.

In addition, in an embodiment, fields of view of the plurality of camera modules 1100a, 1100b, and 1100c may be different. In this case, the plurality of camera modules 1100a, 1100b, and 1100c may include different optical lens, not limited thereto.

In an embodiment, the plurality of camera modules 1100a, 1100b, and 1100c may be disposed to be physically separated from each other. That is, the plurality of camera modules 1100a, 1100b, and 1100c may not use a sensing area of one image sensor 1142, but the plurality of camera modules 1100a, 1100b, and 1100c may include independent image sensors 1142 therein, respectively.

Returning to FIG. 12, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips. In an embodiment, the application processor 1200 may include a re-mosaic processor such as 141 of FIG. 11 for performing re-mosaic processing of the present disclosure.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI based on the MIPI (Mobile Industry Processor Interface), but the present disclosure is not limited thereto.

Meanwhile, in an embodiment, one sub image processor may be disposed to correspond to a plurality of camera modules. For example, the sub image processor 1212a and the sub image processor 1212c may be integrally implemented, not separated from each other as illustrated in FIG. 12; in this case, one of the pieces of image data respectively provided from the camera module 1100a and the camera module 1100c may be selected through a selection element such as a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information Generating Information or a mode signal.

In greater detail, the image generator 1214 may generate the output image by merging at least a portion of the image data respectively generated from the camera modules 1100a, 1100b, and 1100c having different fields of view, depending on the image generating information Generating Information or the mode signal. In addition, the image generator 1214 may generate the output image by selecting one of the image data respectively generated from the camera modules 1100a, 1100b, and 1100c having different fields of view, depending on the image generating information Generating Information or the mode signal.

In an embodiment, the image generating information Generating Information may include a zoom signal or a zoom factor. In addition, in an embodiment, the mode signal may be, for example, a signal based on a mode selected from a user.

In a case where the image generating information Generating Information is the zoom signal or zoom factor and the camera modules 1100a, 1100b, and 1100c have different visual fields of view, the image generator 1214 may perform different operations depending on a kind of the zoom signal. For example, in a case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation. In a case where the zoom signal is a second signal different from the first signal, without the image data merging operation, the image generator 1214 may select one of the image data respectively output from the camera modules 1100a, 1100b, and 1100c and may output the selected image data as the output image. However, the present disclosure is not limited thereto, and the disclosed method to process image data may be modified without limitation.

In an embodiment, the image generator 1214 may generate merged image data having an increased dynamic range by receiving a plurality of image data of different exposure times from at least one of the plurality of sub image processors 1212a, 1212b, and 1212c and performing high dynamic range (HDR processing on the plurality of image data. In addition, in an embodiment, the image generator 1214 may generate image data with an improved resolution by receiving image data where distortion occurs and then performing re-mosaic processing on the image data where distortion occurs, in a direction where distortion occurs.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera such as 1100b depending on the image generating information Generating Information including a zoom signal or the mode signal, and the remaining camera modules such as 1100a and 1100c may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, in a case where the field of view of the camera module 1100a is wider than the field of view of the camera module 1100b and the zoom factor indicates a low zoom ratio, the camera module 1100b may operate as a master, and the camera module 1100a may operate as a slave. In contrast, in a case where the zoom factor indicates a high zoom ratio, the camera module 1100a may operate as a master, and the camera module 1100b may operate as a slave device.

In an embodiment, the control signal provided from the camera module controller 1216 to each of the camera modules 1100a, 1100b, and 1100c may include a sync enable signal. For example, in a case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In an embodiment, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed such as may generate image signals of a first frame rate), may encode the image signals at a second speed higher than the first speed such as may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212*a*, 1212*b*, and 1212*c* of the image processing device 1210 may perform decoding and may also perform image processing on the decoded image signal.

In the second operating mode, the plurality of camera modules 1100*a*, 1100*b*, and 1100*c* may generate image signals at a third speed lower than the first speed, and transmit the image signals to the application processor 1200. For example, the camera modules may generate image signals of a third frame rate lower than the first frame rate. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100*a*, 1100*b*, and 1100*c*, respectively. For example, under control of the application processor 1200, the PMIC 1300 may supply a first power to the camera module 1100*a* through a power signal line PSLa, may supply a second power to the camera module 1100*b* through a power signal line PSLb, and may supply a third power to the camera module 1100*c* through a power signal line PSLc.

In response to a power control signal PCON from the application processor 1200, the PMIC 1300 may generate a power corresponding to each of the plurality of camera modules 1100*a*, 1100*b*, and 1100*c* and may adjust a level of the power. The power control signal PCON may include a power adjustment signal for each operating mode of the plurality of camera modules 1100*a*, 1100*b*, and 1100*c*. For example, the operating mode may include a low-power mode. In this case, the power control signal PCON may include information about a camera module operating in the low-power mode and a set power level. Levels of the powers respectively provided to the plurality of camera modules 1100*a*, 1100*b*, and 1100*c* may be identical to each other or may be different from each other. (In addition, a level of a power may be dynamically changed.

According to an embodiment of the present disclosure, a resolution may be improved by correcting distortion of an image through re-mosaic processing. In particular, an image resolution may be increased, or decreased such as for use in low light conditions, by using an image sensor of a multi-pixel structure.

While the present disclosure has been described with reference to embodiments thereof, it will be apparent to those of ordinary skill in the pertinent art that various changes and modifications may be made thereto without departing from the spirit and scope of the present disclosure as set forth in the following claims.

What is claimed is:

1. An electronic device comprising:
   an image sensor configured to generate pixel data based on light received through a lens that permits distortion where a captured image is compressed in a first direction; and
   an image signal processor configured to perform re-mosaic processing on the generated pixel data for correcting distortion occurring in the first direction and to generate re-mosaiced pixel data,
   wherein the image sensor includes a plurality of unit pixels, each unit pixel having a plurality of sub-pixels arranged in the first direction and a corresponding floating diffusion region shared only by said plurality of sub-pixels, respectively,
   wherein the image signal processor performs binning on pixel values output from sub-pixels constituting each unit pixel in a second direction different from the first direction, and performs the re-mosaic processing on the binned pixel values.

2. The electronic device of claim 1, wherein the image sensor includes a pixel array comprising:
   a first unit pixel including a first plurality of sub-pixels, a first color filter, and a first micro lens;
   a second unit pixel including a second plurality of sub-pixels, a second color filter, and a second micro lens; and
   a third unit pixel including a third plurality of sub-pixels, a third color filter, and a third micro lens.

3. The electronic device of claim 2, wherein the re-mosaic processing includes increasing a resolution of the pixel data in the first direction.

4. The electronic device of claim 3, wherein the image signal processor performs the re-mosaic processing based on at least a portion of pixel data having a same type from among the pixel data.

5. The electronic device of claim 1, wherein the image sensor includes a pixel array comprising:
   a first unit pixel including a first plurality of sub-pixels sharing a first floating diffusion region and a first color filter;
   a second unit pixel including a second plurality of sub-pixels sharing a second floating diffusion region and a second color filter; and
   a third unit pixel including a third plurality of sub-pixels sharing a third floating diffusion region and a third color filter,
   wherein each of the plurality of sub-pixels includes a micro lens.

6. The electronic device of claim 5, wherein the re-mosaic processing includes increasing a resolution of the pixel data in the first direction with regard to the pixel data.

7. The electronic device of claim 6, wherein the image signal processor performs the re-mosaic processing based on at least a portion of pixel data having a same type from among the pixel data.

8. The electronic device of claim 5,
   wherein the image signal processor performs the binning as digital binning, and
   wherein the re-mosaic processing includes increasing a resolution of the pixel data in the first direction.

9. The electronic device of claim 8, wherein the image signal processor performs the re-mosaic processing based on at least a portion of pixel data having a same type from among pixel data obtained as a result of the digital binning.

10. An electronic device comprising:
an image sensor configured to generate pixel data based on light received through a lens that permits distortion where a captured image is compressed in a first direction; and
an image signal processor configured to perform re-mosaic processing on the generated pixel data for correcting distortion occurring in the first direction and to generate re-mosaiced pixel data,
wherein the image sensor includes a plurality of unit pixels, each unit pixel having a plurality of sub-pixels arranged in the first direction and a corresponding floating diffusion region shared only by said plurality of sub-pixels, respectively,
wherein the image sensor includes a pixel array comprising:
a first unit pixel including a first plurality of sub-pixels sharing a first floating diffusion region and a first color filter;
a second unit pixel including a second plurality of sub-pixels sharing a second floating diffusion region and a second color filter; and
a third unit pixel including a third plurality of sub-pixels sharing a third floating diffusion region and a third color filter,
wherein the image signal processor performs binning pixel values output from sub-pixels constituting each unit pixel in a second direction different from the first direction, and performs the re-mosaic processing on the binned pixel values.

11. The electronic device of claim 10, wherein the re-mosaic processing includes increasing a resolution of the pixel data in the first direction.

12. The electronic device of claim 11, wherein the image signal processor performs the re-mosaic processing based on at least a portion of pixel data having a same type from among the pixel data.

13. The electronic device of claim 10,
wherein the image signal processor performs the binning as digital binning, and
wherein the re-mosaic processing includes increasing a resolution of the pixel data in the first direction.

14. The electronic device of claim 13, wherein the image signal processor performs the re-mosaic processing based on at least a portion of pixel data having the same type from among pixel data obtained as a result of the digital binning.

15. A method of processing signals output from an image sensor which includes a plurality of unit pixels, each unit pixel having a plurality of sub-pixels arranged in a first direction and a corresponding floating diffusion region shared only by said plurality of sub-pixels, respectively, the plurality of unit pixels including a first unit pixel including a first plurality of sub-pixels and a first color filter, a second unit pixel including a second plurality of sub-pixels and a second color filter, and a third unit pixel including a third plurality of sub-pixels and a third color filter, the method comprising:

obtaining pixel values from the plurality of sub-pixels, based on light received through a lens that permits distortion where a captured image is compressed in the first direction;
generating pixel data by performing correlated double sampling on the pixel values;
performing off-sensor binning on pixel values output from sub-pixels constituting each unit pixel in a second direction different from the first direction, and
generating re-mosaiced pixel data by performing re-mosaic processing on the binned pixel values for correcting distortion occurring in the first direction.

16. The method of claim 15, wherein the generating of the re-mosaiced pixel data includes increasing a resolution of the pixel data in the first direction.

17. The method of claim 16, wherein the generating of the re-mosaiced pixel data further includes performing the re-mosaic processing based on at least a portion of pixel data having a same type from among the pixel data.

18. The method of claim 15,
wherein the off-sensor binning is performed as digital binning before generating the re-mosaiced pixel data.

19. The method of claim 18, wherein the generating of the re-mosaiced pixel data includes increasing a resolution of the pixel data in the first direction.

20. The method of claim 19, wherein the generating of the re-mosaiced pixel data further includes performing the re-mosaic processing based on at least a portion of pixel data having a same type from among pixel data obtained as a result of the digital binning.

21. A digital camera comprising:
a lens that permits compression of incident light in a first direction;
an image sensor including a plurality of unit pixels configured to generate pixel data based on the incident light received through the lens, each unit pixel having a plurality of sub-pixels arranged in the first direction and a corresponding floating diffusion region shared only by said plurality of sub-pixels, respectively; and
an image signal processor configured to generate re-mosaiced pixel data by decompressing the generated pixel data in the first direction,
wherein the image signal processor re loans binning on pixel values cutout from sub-pixels constituting each unit pixel in a second direction different from the first direction, and performs the re-mosaic processing on the binned pixel values.

22. The digital camera of claim 21, the image sensor comprising:
a first unit pixel including a first plurality of sub-pixels sharing a first floating diffusion region;
a second unit pixel including a second plurality of sub-pixels sharing a second floating diffusion region; and
a third unit pixel including a third plurality of sub-pixels sharing a third floating diffusion region,
wherein the image signal processor is configured to re-mosaic sub-pixels of the first, second and third pluralities to be adjacent to each other in only the first direction.

* * * * *